US012792852B2

(12) United States Patent
Cao et al.

(10) Patent No.: US 12,792,852 B2
(45) Date of Patent: Nov. 10, 2026

(54) WIFI BACKSCATTER COMMUNICATION

(71) Applicant: NXP USA, Inc., Austin, TX (US)

(72) Inventors: Rui Cao, Sunnyvale, CA (US); Franz Amtmann, Graz (AT); Hongyuan Zhang, Fremont, CA (US); Peter Thüringer, Graz (AT); Xilin Cheng, Menlo Park, CA (US); Ralf Michael Kodritsch, Feldkirchen (AT)

(73) Assignee: NXP USA, Inc., Austin, TX (US)

( * ) Notice: Subject to any disclaimer, the term of this patent is extended or adjusted under 35 U.S.C. 154(b) by 49 days.

(21) Appl. No.: 18/923,642

(22) Filed: Oct. 22, 2024

(65) Prior Publication Data

US 2025/0139390 A1 May 1, 2025

Related U.S. Application Data

(60) Provisional application No. 63/594,896, filed on Oct. 31, 2023.

(51) Int. Cl.
*H02J 50/20* (2016.01)
*G06K 7/10* (2006.01)
*H02J 50/00* (2016.01)
*H04W 84/12* (2009.01)

(52) U.S. Cl.
CPC ........ *G06K 7/10366* (2013.01); *H02J 50/001* (2020.01); *H04W 84/12* (2013.01)

(58) Field of Classification Search
CPC .... G06K 7/10366; H02J 50/001; H02J 50/20; H04W 84/12
See application file for complete search history.

(56) References Cited

U.S. PATENT DOCUMENTS

2010/0008244 A1* 1/2010 Sampath ............. H04W 72/541 370/252
2022/0352751 A1* 11/2022 Elshafie .................. H02J 50/23

OTHER PUBLICATIONS

EPCglobal Inc.; "EPC Radio-Frequency Identity Protocals Generation-2 UHF RFID: Specification for RFID Air Interface: Protocal for Communications at 860 MHz-960 MHz"; Version 2.0.0; Nov. 2013; 152 pages.
IEEE; "IEEE P802.11ba Dec. 2020 Draft Standard for Information technology—Telecommunications and information exchange between systems Local and metropolitan area networks—Specific requirements: Part 11: Wireless LAN Medium Access Control (MAC) and Physical Layer (PHY) Specifications; IEEE P802.11ba, P802.11ba/D8.0"; Section 30.3; Dec. 2020; 49 pages.
Kezys, Vytas; "802.11 compatible backscatter prototype"; doc.: IEEE 802.11-23/0056r0; Jan. 11, 2023; 6 pages.

(Continued)

*Primary Examiner* — Jamara A Franklin

(57) ABSTRACT

One example discloses A first wireless communications device, including: a transceiver configured to be coupled to a set of antennas; a controller coupled to the transceiver; wherein the transceiver is configured to transmit a first signal to a second wireless communications device; wherein the transceiver is configured to receive a second signal from the second wireless communications device; wherein the second wireless communications device harvests power from the first signal to enable generation of the second signal; and wherein the first signal is backward compatible with WiFi compliant devices.

27 Claims, 11 Drawing Sheets

(56) References Cited

OTHER PUBLICATIONS

Qi, Yinan et al.; "Discussion of Existing Technologies and Technical Challenges in AMP"; Doc.: IEEE 802.11-23/0836r2; May 13, 2023; 14 pages.
Tian, Bin et al.; "Thoughts on AMP IOT and PAR"; doc.: IEEE 802.11-23/1195r0; Jul. 10, 2023; 7 pages.
Wikipedia; "Ambient backscatter"; Retrieved from internet https://en.wikipedia.org/wiki/Ambient_backscatter on Oct. 21, 2024; 3 pages.
Wikipedia; "Radio-frequency identification"; Retrieved from internet https://en.wikipedia.org/wiki/Radio-frequency_identification on Oct. 21, 2024; 32 pages.
Xu et al.; "IEEE P802.11 Wireless LANs"; doc. IEEE 802.11-23/2203r1; Nov. 15, 2023; 51 pages.

* cited by examiner

800

810

WIFI BACKSCATTER COMMUNICATION

REFERENCE TO PROVISIONAL APPLICATION TO CLAIM PRIORITY

A priority date for this present U.S. patent application has been established by prior U.S. Provisional Patent Application, Ser. No. 63/594,896, entitled "Backscattering For Ambient Power Wifi-Protocol, Frame, Modulation", filed on Oct. 31, 2023, and commonly assigned to NXP USA, Inc.

The present specification relates to systems, methods, apparatuses, devices, articles of manufacture and instructions for WiFi backscatter communication.

SUMMARY

According to an example embodiment, a first wireless communications device, comprising: a transceiver configured to be coupled to a set of antennas; a controller coupled to the transceiver; wherein the transceiver is configured to transmit a first signal to a second wireless communications device; wherein the transceiver is configured to receive a second signal from the second wireless communications device; wherein the second wireless communications device harvests power from the first signal to enable generation of the second signal; and wherein the first signal is backward compatible with WiFi compliant devices.

In another example embodiment, the first device is a WiFi compliant device.

In another example embodiment, the second device is only powered by the first signal.

In another example embodiment, the second device is a backscatter tag.

In another example embodiment, the second device is configured to harvest power from an energizer waveform in the first signal.

In another example embodiment, part of the preamble of the first signal can be decoded and understood by the devices that is IEEE 802.11 standard compliant.

In another example embodiment, the second signal is a backscattered version of the first signal.

In another example embodiment, the second signal has a same carrier frequency as the first signal.

In another example embodiment, the second signal includes modulated data obtained from the second device.

In another example embodiment, the modulated data is encoded using at least one of: On/Off keying (OOK), amplitude shift keying (ASK), frequency shift keying (FSK), or phase shift keying (PSK).

In another example embodiment, the first device is a WiFi reader device that is configured to both provide power to the second device and receive data from the second device in response.

In another example embodiment, the first signal has an OFDM preamble.

In another example embodiment, the second portion of the first signal have an ON energy state; and the second device is configured to harvest power from an energizer waveform in the first signal.

In another example embodiment, the second portion of the first signal is a single-carrier waveform.

In another example embodiment, the second portion of the first signal is an OFDM waveform.

In another example embodiment, energizing symbols transmitted in the first signal alternate with backscatter data received in the second signal.

In another example embodiment, the first signals are OFDM waveforms; each OFDM waveform includes a set of resource units (RUs); a subset of RUs in the first signal are unpopulated; and the second device is configured to shift the signal to the unpopulated RUs and modulate data in the second signal.

In another example embodiment, a set of edge RUs in the first signal are unpopulated by the energizer waveform.

In another example embodiment, a set of center resource units (RUs) in the first signal are unpopulated by the energizer waveform.

In another example embodiment, one-side of resource units (RUs) in the first signal are unpopulated by the energizer waveform.

In another example embodiment, a distributed set of resource units (RUs) in the first signal are unpopulated by the energizer waveform.

In another example embodiment, the second device is configured to uniquely encode data transmitted in the second signal.

In another example embodiment, the first device is configured to be coupled to a set of antennas that spatially steer the first signal transmission to the second device and null to the receive antenna.

In another example embodiment, the first signal includes a WiFi compliant preamble; and the second device is configured to harvest power from an energizer waveform in the PPDU.

In another example embodiment, the PPDU includes a preamble, a set of energizer symbols, and a control payload.

In another example embodiment, the PPDU includes reference symbols; and the first device is configured to use the reference symbol to estimate the leakage signal and remove the leakage energizer waveform from the second signal received from the second device.

According to an example embodiment, a first wireless communications device, comprising: a transceiver configured to be coupled to a set of antennas; a controller coupled to the transceiver; wherein the transceiver is configured to receive a first signal from a second wireless communications device; wherein the transceiver is configured to transmit a second signal to the second wireless communications device; wherein the first wireless communications device harvests power from the first signal to enable generation of the second signal; and wherein the first WiFi compliant signals.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
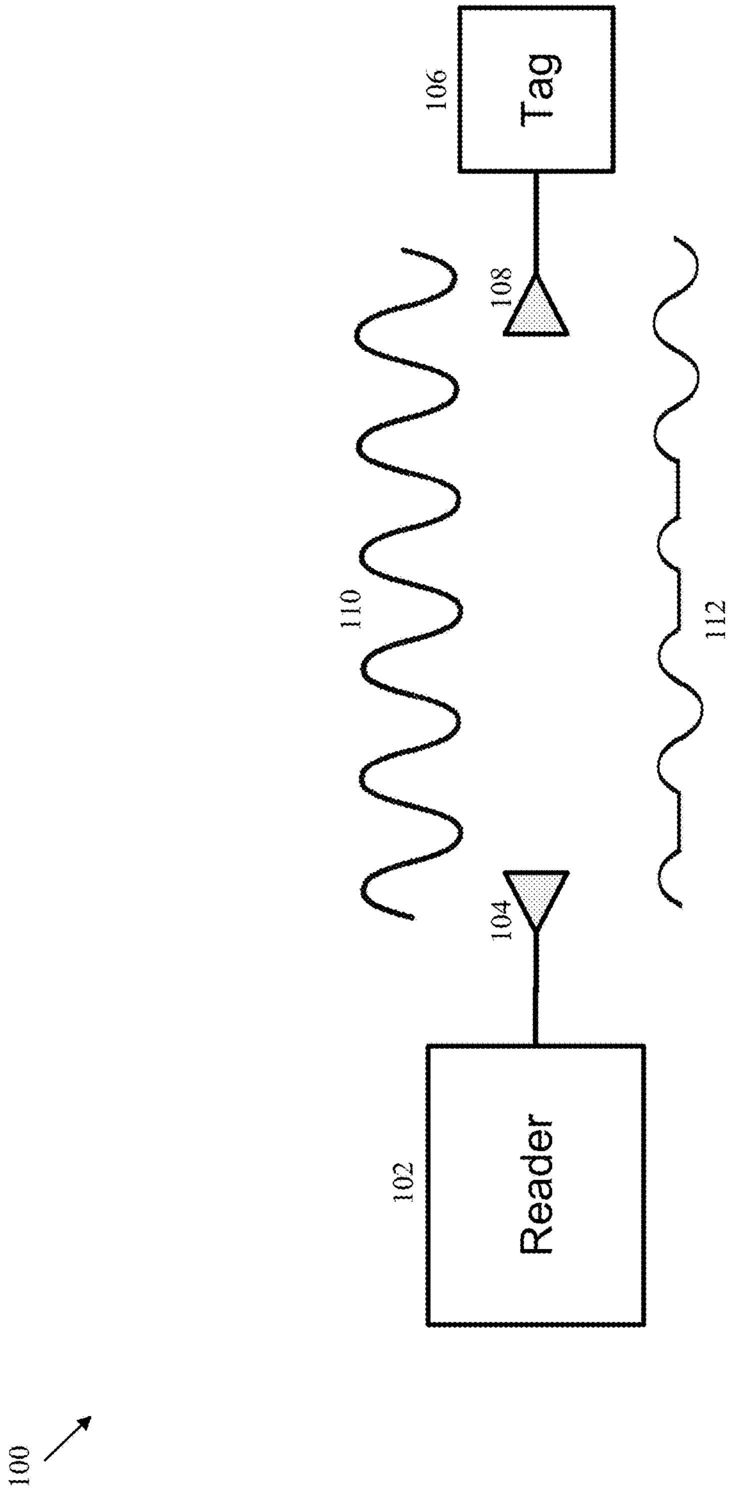
FIG. 1 represents an example of RFID backscatter communication.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Ambient power (AMP) devices, using ambient backscatter communications, leverage the power in a reader's transmit signals to power a receiving device (e.g. RFID tag). Often such receiving devices have only that power from the reader's transmit signals to process and return sensor and/or other data back to the reader.

One of the many benefits of ambient backscatter communications includes obtaining information from other receiving devices that otherwise do not have a power source (e.g. a battery), such as edge devices, Internet-of-Things (IoT) devices, data tags, environmental sensors, and the like.

Radio-frequency identification (RFID) is a type of ambient power tag technology for mid-range communications and is used to identify, locate, authenticate and engage items in markets including but not limited to retail, third party logistics, manufacturing, aviation, pharma, etc., and typically operates in the sub-1 GHz band. RFID uses electromagnetic signals in the UHF band to automatically query tags, attached to goods or structures, for their data. When polled by a wireless signal from a nearby RFID reader device, the tag responds by transmitting data back to the reader. Passive RFID tags are powered by energy received from the RFID reader's wireless signal, while Active tags are powered by a battery and thus can be read at a greater range from the RFID reader. RFID systems however requires high-cost and bulky RFID readers, which typically limit their use to just commercial and factory environments.

FIG. 1 represents an example 100 of RFID backscatter communication. The example 100 shows an RFID reader 102 having an antenna 104, and an RFID tag 106 having its own antenna 108. The RFID reader 102 transmits an energizing waveform 110, and the RFID tag 106 uses that energizing waveform 110 to power the RFID tag 106 and respond by transmitting a modulated backscatter waveform 112 containing data.

The RFID reader 102 then decodes the modulated backscatter waveform 112 for the data transmitted by the RFID tag 106. Since there is a large dynamic range between the energizing waveform 110 and the modulated backscatter waveform 112, power leakage within the RFID reader 102 makes it challenging to separate out the modulated backscatter waveform 112 from the power leakage from the energizing waveform 110 within the RFID reader 102.

To address this power leakage RFID readers 102 often include circuits that are complex, power intensive, and require more physical space to implement (e.g. Tx/Rx circulators and/or frequency shifting circuits).

Now discussed are various protocols, message frames, and/or signal modulations for implementing WiFi backscatter communication.

WiFi is a popular wireless communication technology which is widely deployed in consumer devices e.g. in cellphones, tablets, computers, smart home devices and in office buildings, public areas such as shopping malls, hotels, transportation, etc. To enable backscatter communications on WiFi devices would greatly enable more use cases for ambient power devices such as edge devices, Internet-of-Things (IoT) devices, data tags, environmental sensors, and the like for everyone with access to a smartphone, for example.

Since WiFi signals are different from RFID signals, WiFi backscatter communication devices (e.g. smartphones) would need to be different and much less complex, power intensive, and/or physical space consuming. Such WiFi backscatter communication devices should also be backward compatible with existing WiFi signals and communications (e.g. 20 MHz channel BWs, symbol based waveforms (e.g. OFDM, DSSS), and higher carrier frequencies (2.4 GHz, 5 GHz, 6 GHZ, etc).

Figure 2A:
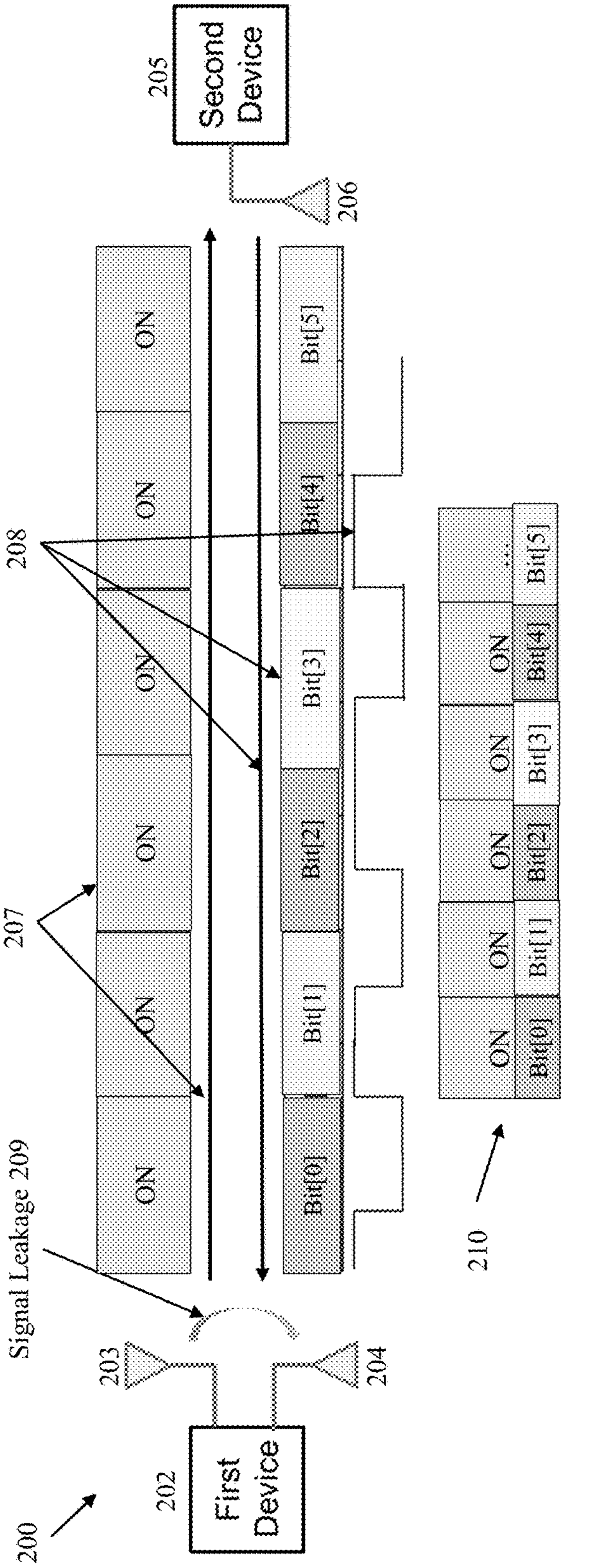
FIG. 2A represents a first example of WiFi backscatter communication using power domain multiplexing (PDM).

FIG. 2A represents a first example 200 of WiFi backscatter communication using power domain multiplexing (PDM). The first example 200 PDM includes a first wireless communications device 202 (e.g. a WiFi compliant device such as an access point (AP)). The first device 202 includes a transmit (TX) antenna 203, a receive (RX) antenna 204, a transceiver (not shown), and a controller (not shown). The first example 200 PDM also includes a second wireless communications device 205 (e.g. a WiFi compliant ambient power tag) that includes an antenna 206.

The transceiver is coupled to the antennas 203, 204 and the controller. The controller commands the transceiver to transmit a first signal 207 (e.g. energizing waveform) from antenna 203 to the second device 205. The second device 205 harvests power from the first signal 207 (e.g. energizing waveform) to enable generation of a second signal 208 (e.g. modulated backscatter waveform). The second signal 208 (e.g. modulated backscatter waveform) is modulated (e.g. using amplitude or phase modulation) with data stored in and/or collected by the second device 205.

The transceiver in the first device 202 (e.g. a WiFi compliant device such as an access point (AP)) receives a combined signal 210 on the antenna 204, which is the sum of the second signal 208 (e.g. modulated backscatter waveform) and the third signal 209 leakage from the first signal 207 (e.g. energizing waveform) and noise, after removing all or part of the leakage signal 209 from the, demodulates the second signal 208 (e.g. modulated backscatter waveform) to retrieve the data stored in and/or collected by the second device 205.

In some example embodiments for simplicity, a carrier frequency of the first signal 207 (e.g. energizing waveform) is the same as a carrier frequency of the second signal 208 (e.g. modulated backscatter waveform).

The two antennas 203, 204 of the first device 202 (one antenna for TX and the other antenna for RX) can improve signal isolation and reduce the signal leakage 209, but also can extend the communication range with the second device 205 (e.g. ambient power tag)

The first example 200 PDM is an example of a monostatic WiFi backscatter communications device, since the first device 202 (e.g. a WiFi reader) both provides power to other devices, such as the second device 205 (e.g. ambient power tag), and receives sensor and/or other data directly in return. In contrast, a bistatic WiFi backscatter communications system would be one where one WiFi device (e.g. perhaps higher-power, and/or larger antenna) transmits the first signal 207 (e.g. energizing waveform) and another WiFi device (e.g. perhaps lower-power, and/or smaller antenna) receives the second signal 208 (e.g. modulated backscatter waveform).

In various example embodiments, the combined signal 210 at the antenna 204 can be described by the equation: Z=HX+GY+N, where H is self-coupling channel, X is the first signal 207 (e.g. energizing waveform), G is reflection channel, Y is Tag modulated data, and N is noise. H can be estimated with the channel training symbols in the energizer waveform X. The first signal 207 (e.g. energizing waveform) X may be LTF symbols.

Second wireless communications device 205 tag data is modulated on the energizer waveform and backscattered to the WiFi reader. Candidate modulations are On/Off keying (OOK), Amplitude shift keying (ASK), phase shift keying (PSK), or frequency shift keying (FSK).

In some example embodiments, the first signal 207 (e.g. energizing waveform) is a wide BW OFDM/TD (IEEE 802.11b) waveform and all symbols will be all "ON" energy as shown in FIG. 2A. The second wireless communications device 205 modulates the tag's information using ASK or PSK without frequency change and thus the backscattered signal is overlapped with the energizer waveform. The first device 202 detects the amplitude or phase of reflection to retrieve the tag information, after the energizer leakage signal 209 is removed. TD repetition may be needed to counter a possible 50~60 dB reflection loss.

In many example embodiments, the first device's 202 (e.g. WiFi reader) transceiver will obtain/estimate the first signal 209 (e.g. the leakage energizing waveform, reference symbol signal, etc.) and remove the first signal 209 from the combined signal 210 to obtain the backscattered symbol data. This removal can be simply subtraction or an advanced nulling method. The transceiver can then detect the modulated data (OOK, PSK, etc) from the residue signal after the removal. No need for CFO estimation and compensation as the first signal 209 is from the same LO (local oscillator), but the second device's 205 clock inaccuracy may need to be compensated for.

In some example embodiments, an interference training PPDU is used to characterize the channel H, G to better remove the first signal 209 from the combined signal 210 during demodulation.

In other example embodiments, the first device 202 can vary various protocol, frame or modulation characteristics of the first signal 207 to better remove the leakage 209 and demodulate the second signal 208.

In some example embodiments, to remove strong Tx 203 to Rx 204 leakage signal 209, the WiFi reader 202 can use either differential encoding for signal 207, such that the receiver chain 204 can easily remove the leakage 209 with differential decoding. Repetition coding can be used by the second device 205 to boost detection SNR. Both techniques can be used together.

In some example embodiments, the differential encoding can be described by the equation: $y(t)=h_{dp}x(t)+h_{bs}x(t-\tau)+n(t)$, where: x(t) is the first signal 207 (e.g. energizing waveform); s(t) is information modulated on the second signal 208 (e.g. modulated backscatter waveform); $h_{dp}$ is a direct path (leakage) channel response, strong signal; $h_{bs}$ is a backscattered path channel response (assumed to be at least −50 dB lower than leakage 209 from the energizer signal 207); τ is a backscattered propagation delay; and n(t) is noise, determined by the SNR ceiling (e.g. −44 dB).

In various example embodiments, $h_{bs}$ is roughly 6 dB lower than noise based on the assumption (50−40=6 dB) and s(t) is modulated with differential coding, and repeated N times.

Then to detect s(t) (i.e. information modulated on the second signal 208), the WiFi reader 202 can perform coherent detection differential decoding, which can be described by the equation: $y(n)-y(n-1)=$ ~~$(h_{dp}[n]-h_{dp}[n-1])x(t)+$~~ $h_{bs}x(t-\tau)[s(t)-s(t-1)]+[N(n)-N(n-1)]=2\cdot h_{bs}x(t-\tau)s(t)+[N(n)-N(n-1)]$. Note the crossed out portion is essentially equal to zero.

Repetition coding herein refers to repeated modulation of the tag's data on multiple symbols of the second signal 208 (e.g. modulated backscatter waveform). Further symbol averaging can also boost the detection SNR (e.g. 4 repetition provide 6 dB gain and detection SNR about 0 dB; 8 repetition and detection SNR of −3 dB, etc.)

Figure 2B:
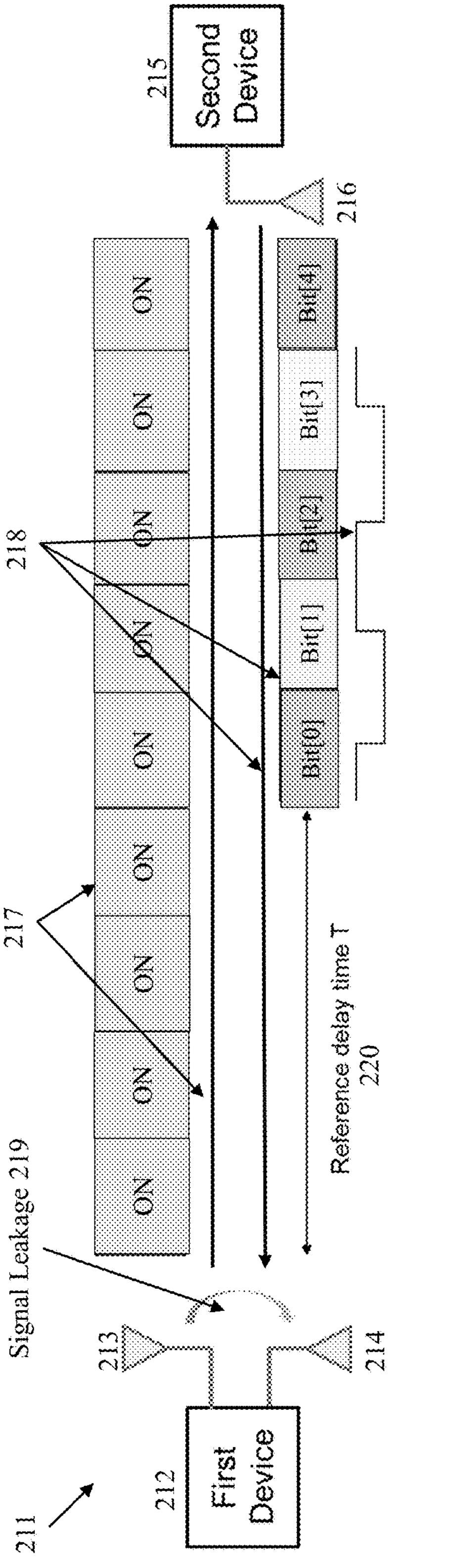
FIG. 2B represents a second example of WiFi backscatter communication using PDM.

FIG. 2B represents a second example 211 of WiFi backscatter communication using PDM. The second example 211 PDM includes a first wireless communications device 212 (e.g. a WiFi compliant device such as an access point (AP)). The first device 212 includes a transmit (TX) antenna 213, a receive (RX) antenna 214, a transceiver (not shown), and a controller (not shown). The second example 211 PDM also includes a second wireless communications device 215 (e.g. a WiFi compliant ambient power tag) that includes an antenna 216. A first signal 217 (e.g. energizing waveform), a second signal 218 (e.g. modulated backscatter waveform), and signal leakage 219 are as shown and operate similarly to those discussed in FIG. 2A, except as described below.

In this second example 211 PDM, the second device 215 (e.g. AMP tag) delays data modulation by a reference delay time (T us) 220 (e.g. by M symbols). The value can be determined by the first device 212 (e.g. WiFi reader) and be indicated in a control frame sent to the second device 215 (e.g. AMP tag). The second device 215 (e.g. AMP tag) may further skip data modulation on M symbols (T us) for every B bits modulation, for the reader to update reference signal.

Figure 3A:
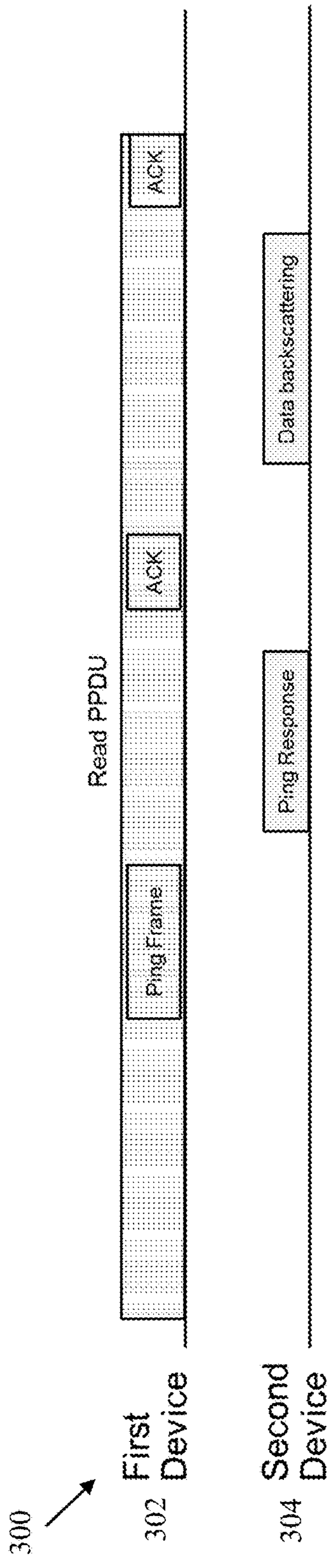
FIG. 3A represents a first example protocol for WiFi backscatter communication using PDM.

FIG. 3A represents a first example protocol 300 for WiFi backscatter communication. In this example protocol 300 the first device 302 transmits a single WiFi compliant read PPDU to wake up the second device 304. A starting unmodulated portion of the PPDU (~1 ms) enables the second device 304 to prepare for backscattering data. The first device 302 then modulates the request signal on the second portion of the PPDU to ping the second device 304, and followed by a third unmodulated portion of the PPDU which energizes the second device 304 to respond to the ping (e.g. acknowledge the ping, identify the tag ID, exchange security key, etc.). The first device 302 acknowledges the ping response and energizes the second device 304 to send back the backscattered data. The first device 302 then acknowledges receipt of the data. Note in various example embodiments, the various protocol and PPDU definitions discussed in FIGS. 3A through 4B are general to any multiplexing method.

Figure 3B:
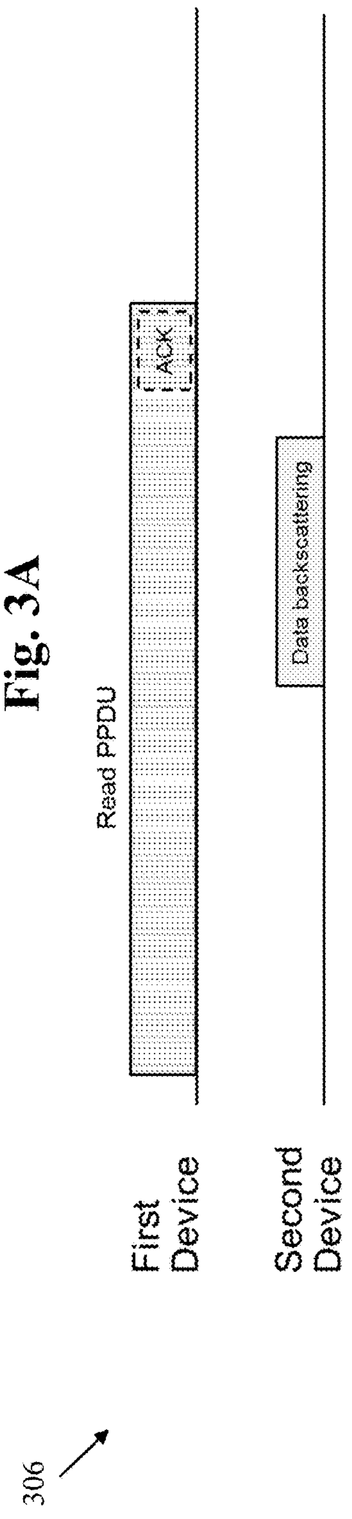
FIG. 3B represents a second example protocol for WiFi backscatter communication using PDM.

FIG. 3B represents a second example protocol 306 for WiFi backscatter communication. The second example protocol 306 is a simplified version of the first example protocol 300, where the first device 302 sends a single WiFi compliant read PPDU to wake up an second device 304 and simultaneously energize the second device 304 to send backscattered data, including tag info, stored data back to the first device 302. Optionally the first device 302 can acknowledge receipt of the data.

Figure 3C:
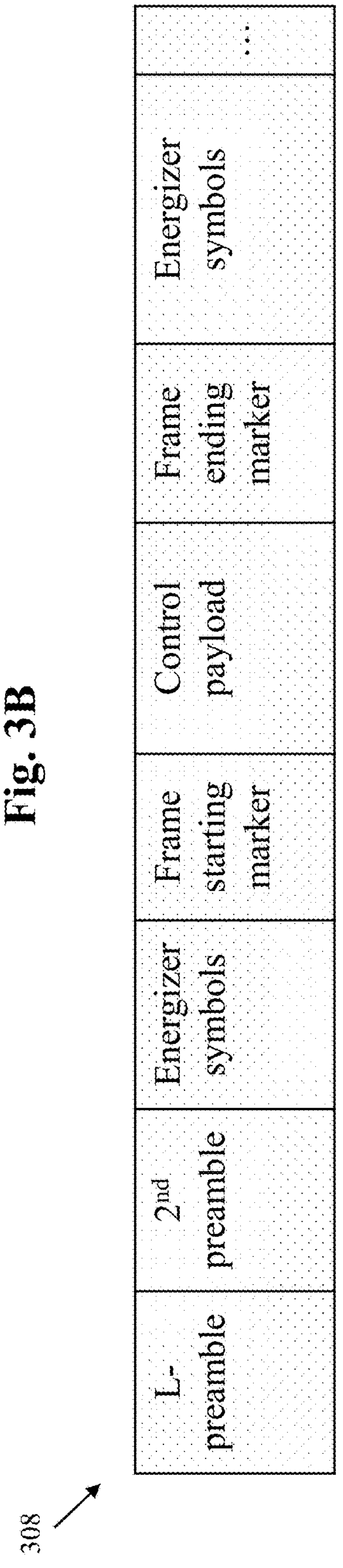
FIG. 3C represents an example PPDU frame for either the first or second protocols.

FIG. 3C represents an example PPDU 308 for WiFi backscatter communication. Building upon the first and second protocols 306, 308, the example Read PPDU 308 is as shown. The Read PPDU 308 provides energy for tag to backscatter and also sends control frame payloads to the second device 304. The Read PPDU 308 is also backward compatibility to legacy WiFi STAs.

In some example embodiments, the Read PPDU 308 starts with legacy preamble portion (OFDM (L-STF, L-LTF, L-SIG) or 11b DSSS preamble). A 2nd preamble portion may exist for backscattering control indication and legacy spoofing if needed similar to an IEEE 802.11ba preamble design.

The Read PPDU 308 also includes a sequence of energizer symbols. A frame starting marker and ending marker can be inserted before and after the control frame payload as shown. The frame markers can be either predefined modulated signals or have zero energy (e.g. is a SIFS gap).

Figure 4A:
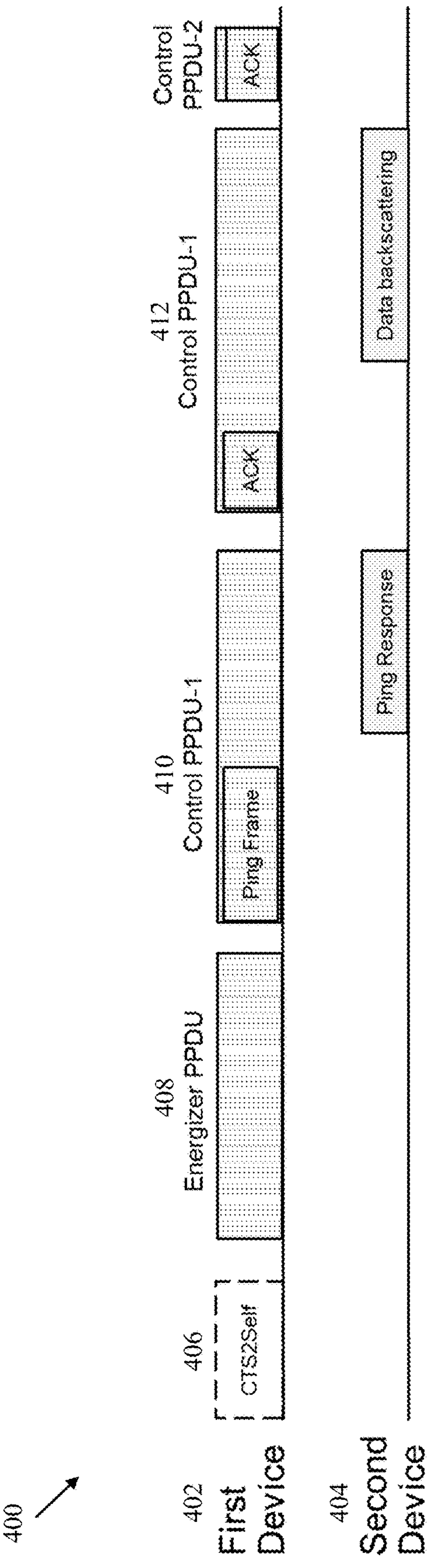
FIG. 4A represents a third example protocol for WiFi backscatter communication using PDM.

FIG. 4A represents a third example protocol 400 for WiFi backscatter communication. Here, instead of a single read PPDU with frame marker to separate different functionality portion for communications between a first device 402 and a second device 404, multiple PPDUs 406, 408, 410, 412 can be defined.

For example the third example protocol 400 shows an energizer PPDU 408 plus control PPDUs 410, 412. The energizer PPDU 408 is for energizing the second device 404 for wakeup and/or backscattered transmission. The control PPDU-1 410 is for sending control signals and energize the second device 404 to send immediate feedback through backscattering. The control PPDU-2 412 is for only sending control signals to the second device 404.

In many example embodiments, the first device 402 sends out this sequence of PPDUs, each with an independent preamble. If any intermediate PPDU fails, the first device 402 may resend the corresponding one that failed, as long as a resend gap is small enough (e.g. 140 us). In this case, a medium reservation frame (e.g. CTS2self 406) can be sent before the sequence of energizer 408 and control 410, 412 PPDUs to protect the entire PPDU sequence exchange.

Figure 4B:
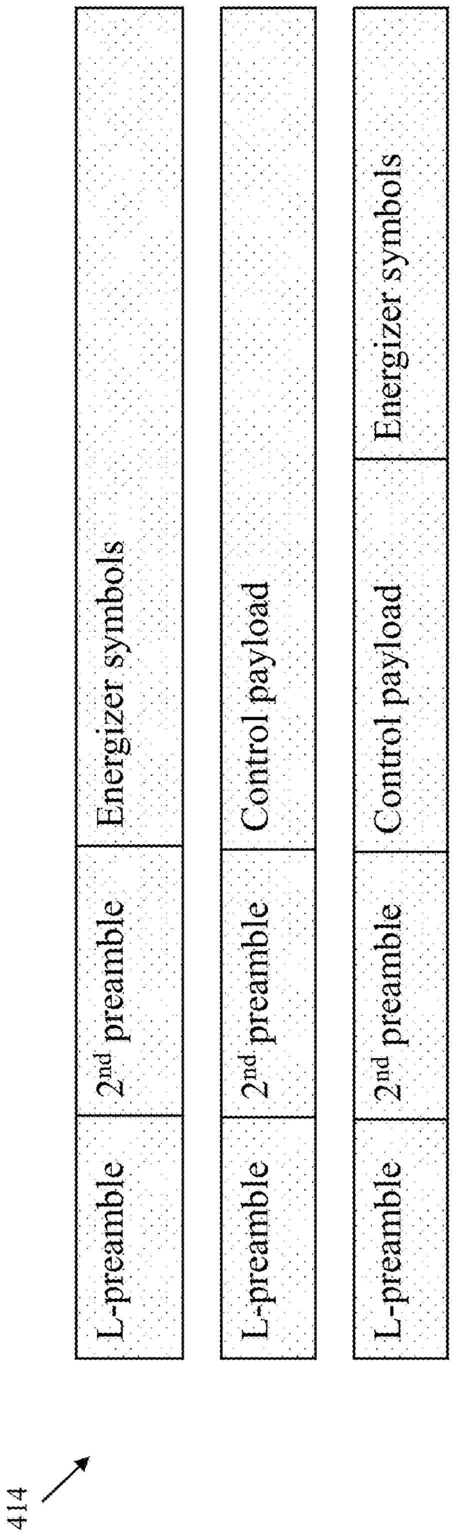
FIG. 4B represents an example PPDU frame for the third protocol.

FIG. 4B represents an example PPDU frame 414 for the third protocol 400. The preamble design of "L-preamble" and "2nd preamble" consideration can be the same as for the read PPDU.

In either read PPDU/energizer PPDU or Control-PPDU-1, the energizer symbols exist for either second device 404 wakeup or provide carrier to the second device 404 to backscatter its data. The symbols in these PPDUs can have either constant energy or partial energy.

In a first example, the energizer symbols are 20 MHz OFDM symbols with a predefined pattern (e.g. 11a OFDM symbol with pre-defined subcarrier modulation content; apply predefined symbol-level randomization to reduce Tx spectrum leakage; and/or symbol-by-symbol BPSK phase defined similar as 802.11 scrambler with fixed seed.

In a second example, the energizer symbols are 20 MHz 11b symbols with predefined payload (e.g. predefined content similar as 802.11 scrambler with fixed seed).

In a third example, the energizer symbols are narrow-bandwidth symbols with predefined payload (e.g. WUR OOK symbol (~4 MHz) or modified modulation with full energy symbol).

In either read PPDUs or Control-PPDU-1/Control-PPDU-2, the first device 402 sends control payload to the second device 404 (e.g. ping/query, ACK, etc.). The modulation for the control payload should be simple for the second device 404 (e.g. ambient-power tag) to process with limited power. Low power candidate modulations include On/Off keying (OOK), Amplitude shift keying (ASK), or phase shift keying (PSK) (e.g. IEEE 802.11ba OOK modulation). To simplify the second device's 404 receiver design, only one data rate may be defined.

Figure 5A:
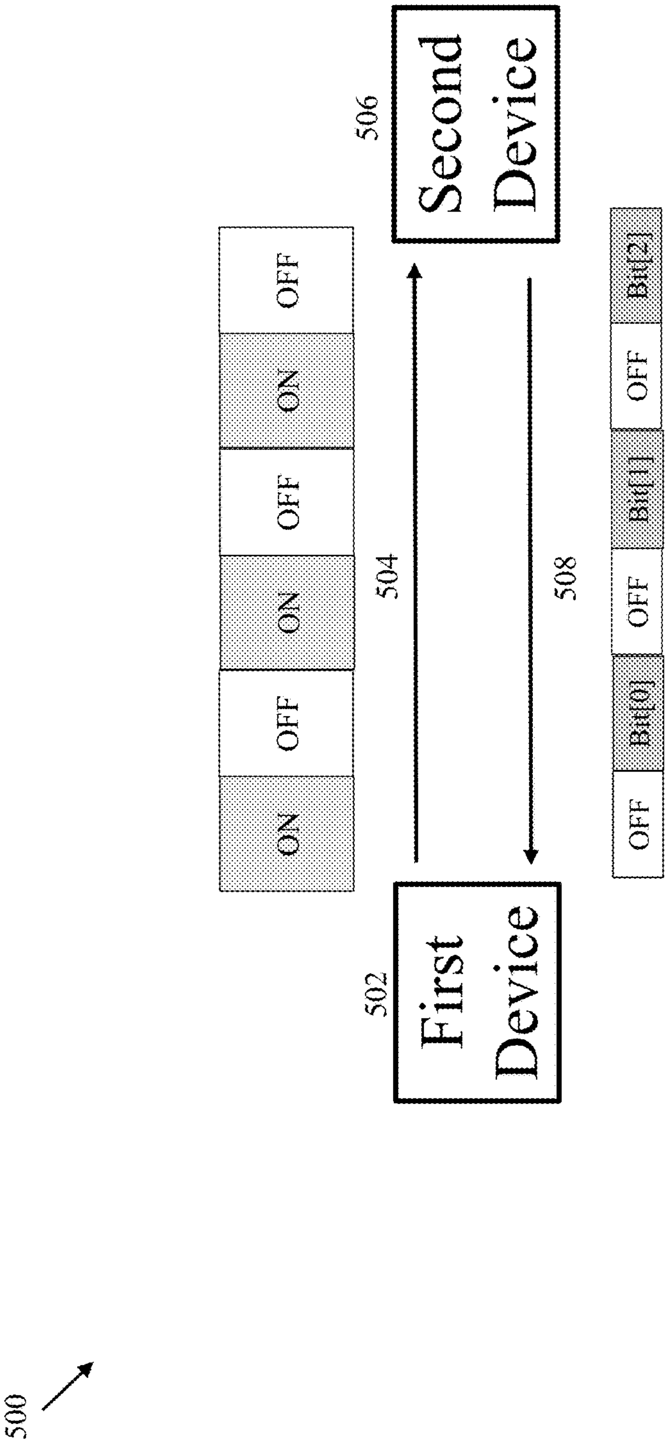
FIGS. 5A, 5B represent an example of WiFi backscatter communication using time domain multiplexing (TDM).
Figure 5B:
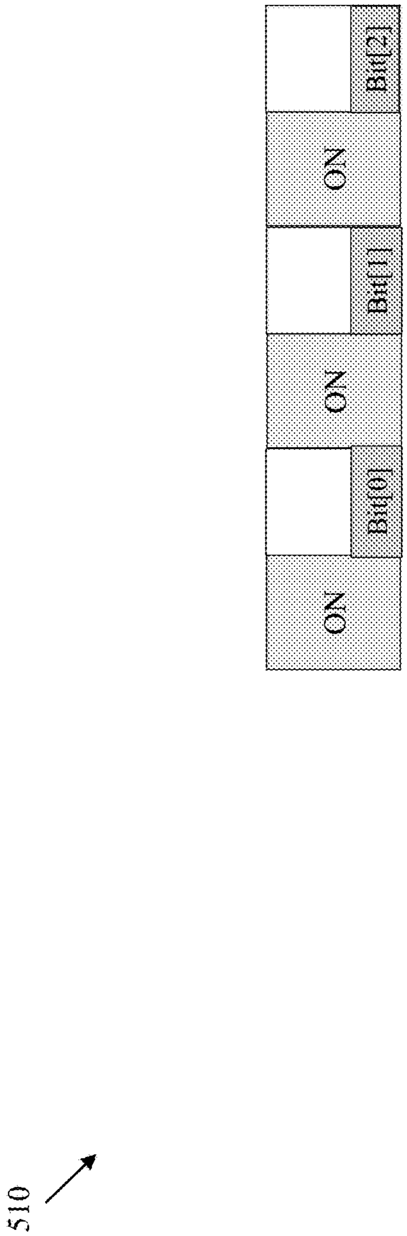

FIGS. 5A, 5B represent an example 500 of WiFi backscatter communication using Time-domain multiplexing (TDM). A first device 502 transmits a first signal 504 (e.g. energizing waveform) to a second device 506. The second device 506 replies with a second signal 508 (e.g. modulated backscatter waveform). An example composite signal 510 overlaying the first signal 504 with the second signal 508 is as shown.

The first signal 504 is an OOK waveform. The OOK waveform may reuse IEEE 802.11ba waveform with predefined payload sequence. The second device 506 modulates the information based on the ON symbol, but delays the reflected backscatter data to the OFF symbol/portion. The first device 502 detects energy on the OFF symbol/portion to retrieve the backscatter data information.

Figure 6A:
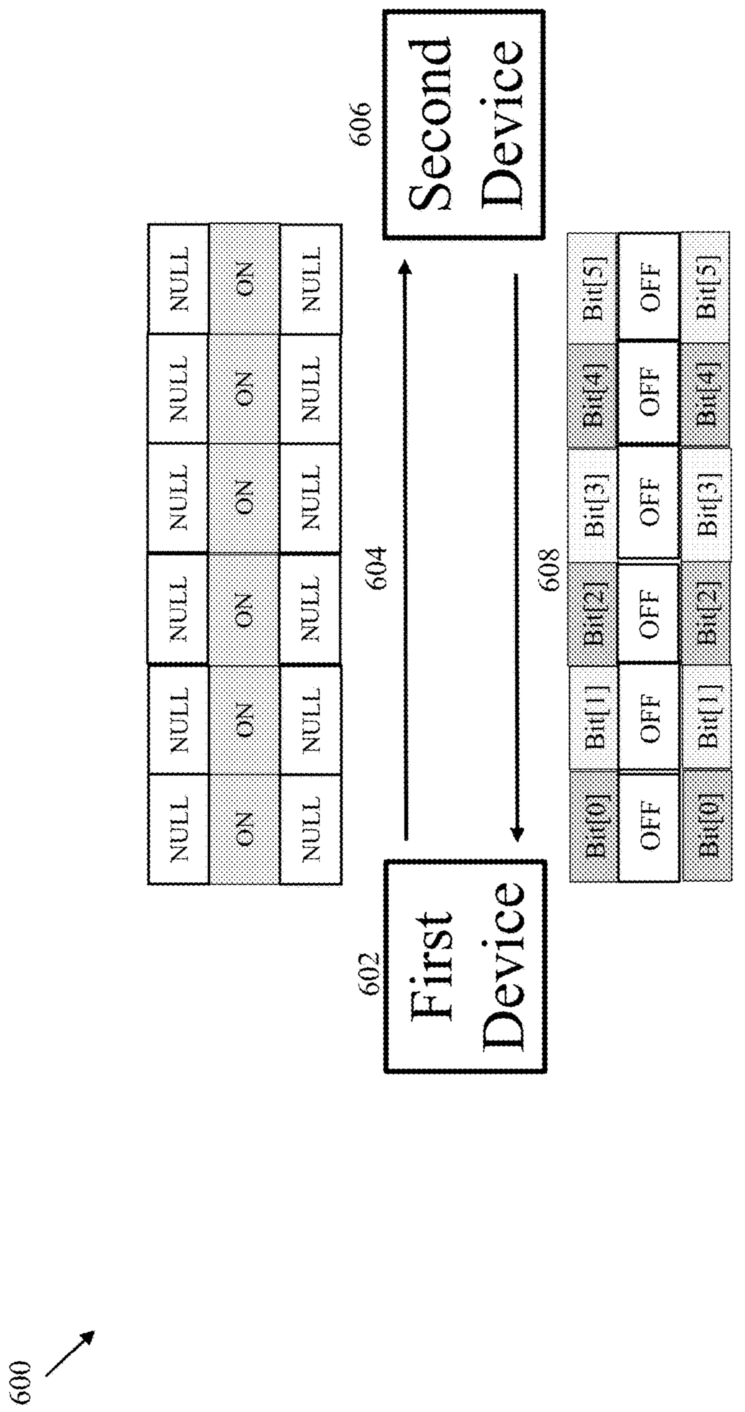
FIGS. 6A, 6B represent a first example of WiFi backscatter communication using frequency domain multiplexing (FDM) where edge RUs (resource units) of an energizing waveform are unpopulated.
Figure 6B:
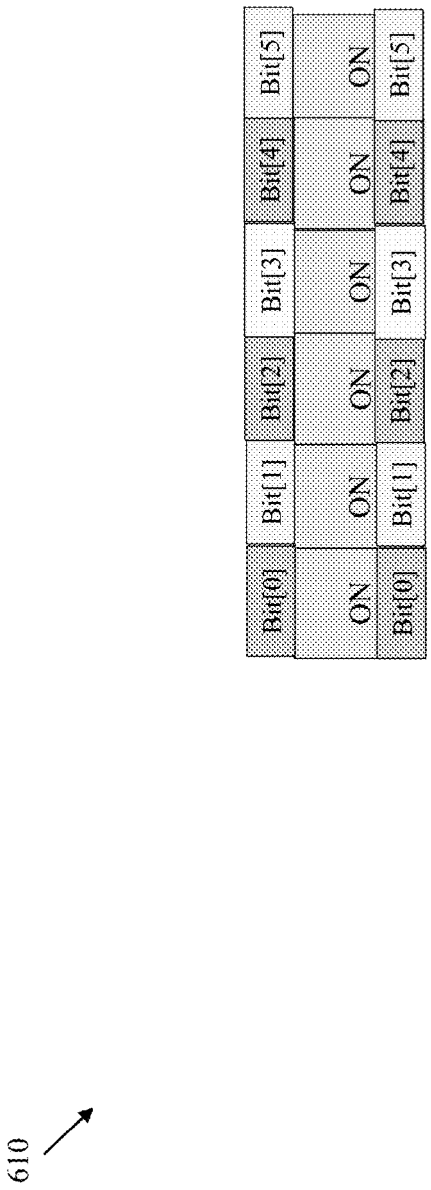

FIGS. 6A, 6B represent a first example 600 of WiFi backscatter communication using frequency domain multiplexing (FDM) where edge RUs (resource units) of an energizing waveform are unpopulated. A first device 602 transmits a first signal 604 (e.g. energizing waveform) to a second device 606. The second device 606 replies with a second signal 608 (e.g. modulated backscatter waveform). An example composite signal 610 overlaying the first signal 604 with the second signal 608 is as shown.

The first signal 604 is a Wide BW OFDM waveform that is all "ON" energy for energizer waveform. The first device 602 transmits energy on only part of the spectrum (e.g. OFDMA waveform with some RUs unmodulated). For example edge RUs can be unpopulated, and the first device 602 (e.g. WiFi reader) can notch the center RU from signal 610 to detect the modulated information.

The second device 606 shifts the waveform to a different channel or RU and modulate the information using OOK/ASK or PSK. The first device 602 detects the reflected information on the unmodulated channel/RU.

Figure 7A:
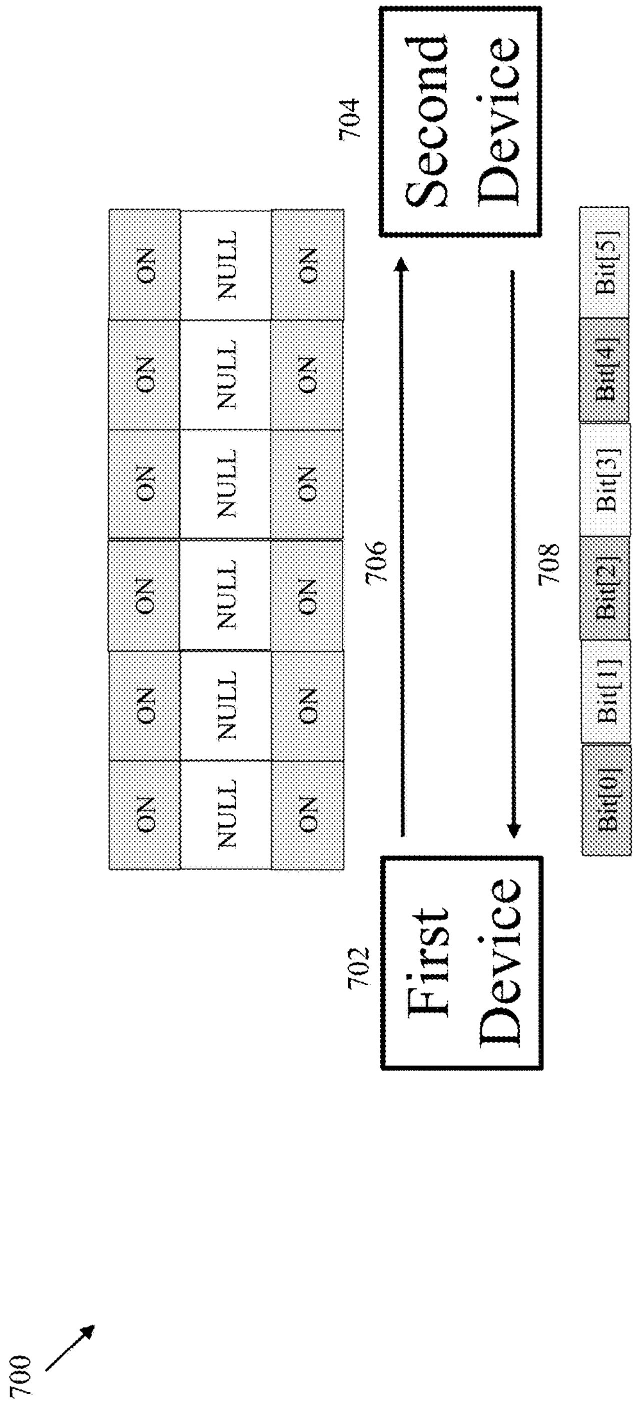
FIGS. 7A, 7B represent a second example of WiFi backscatter communication using frequency domain multiplexing (FDM) where center RUs (resource units) of an energizing waveform are unpopulated.
Figure 7B:
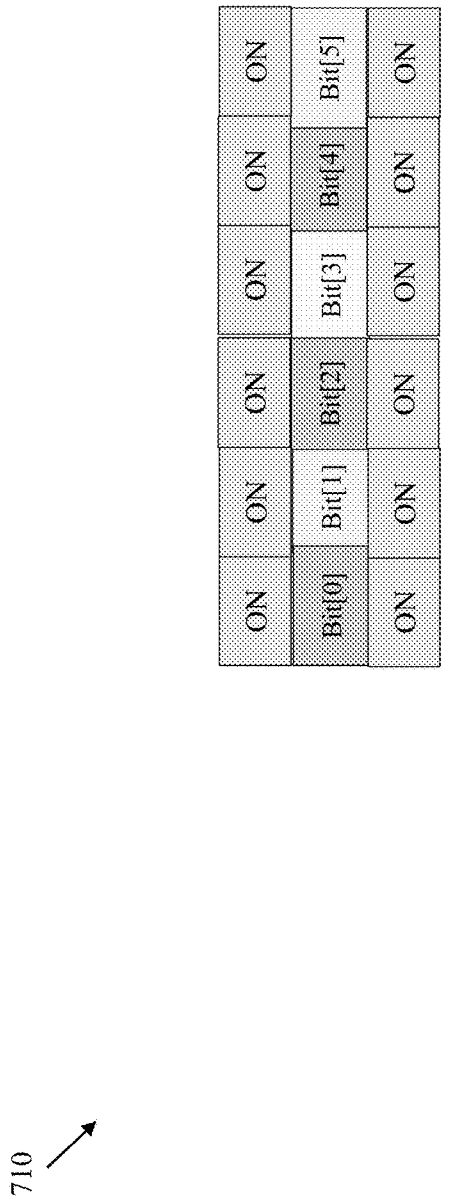

FIGS. 7A, 7B represent a second example 700 of WiFi backscatter communication using frequency domain multiplexing (FDM) where center RUs (resource units) of an energizing waveform are unpopulated. A first device 702 transmits a first signal 704 (e.g. energizing waveform) to a second device 706. The second device 706 replies with a second signal 708 (e.g. modulated backscatter waveform).

An example composite signal 710 overlaying the first signal 704 with the second signal 708 is as shown.

The first signal 704 is a Wide BW OFDM waveform that is all "ON" energy for energizer waveform; however the center RUs are unpopulated. The first signal 704 includes internally null center RU for the second device 706 to shift waveform and modulate its backscatter data on.

The first device 702 then uses a smaller low-path filter to remove the leakage signal (e.g. center 1 or 2 MHz (BT filter), and demodulates the backscatter signal from filtered waveform. For example, a cochannel BT path can be used as the receive path for backscatter data detection.

Figure 8A:
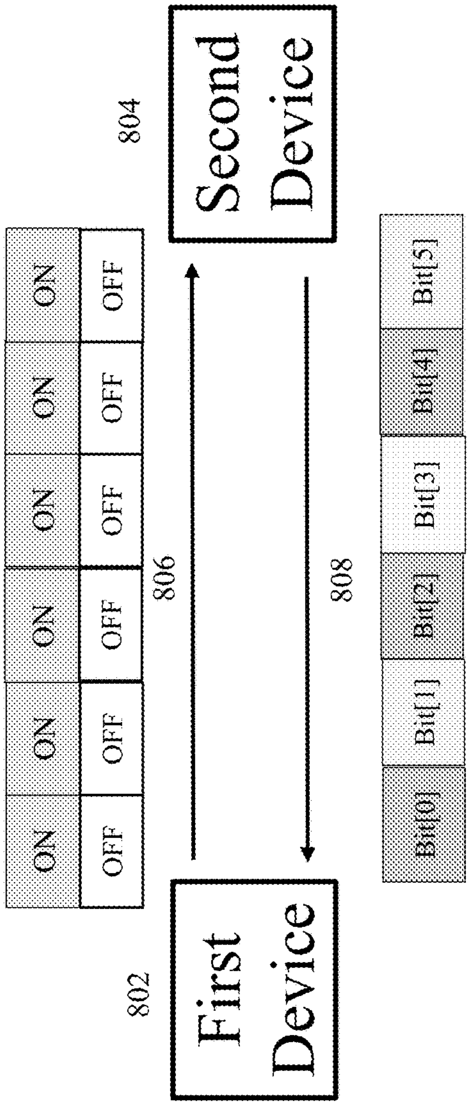
FIGS. 8A, 8B represent a third example of WiFi backscatter communication using frequency domain multiplexing (FDM) where one of side RUs (resource units) of an energizing waveform are unpopulated.
Figure 8B:
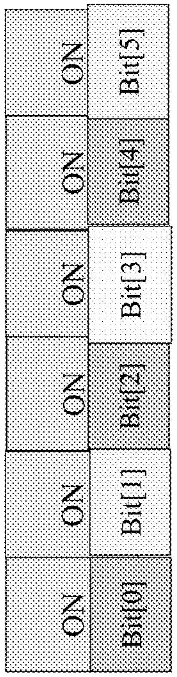

FIGS. 8A, 8B represent a third example 800 of WiFi backscatter communication using frequency domain multiplexing (FDM) where one of side RUs (resource units) of an energizing waveform are unpopulated. A first device 802 transmits a first signal 804 (e.g. energizing waveform) to a second device 806. The second device 806 replies with a second signal 808 (e.g. modulated backscatter waveform). An example composite signal 810 overlaying the first signal 804 with the second signal 808 is as shown.

The first signal 804 is a Wide BW OFDM waveform that is all "ON" energy for the energizer waveform; however one of side of RUs are unpopulated. The first signal 804 includes internally null one side of the BW for the second device 806 to shift waveform and modulate its backscatter data on. The first device 802 uses a smaller low-path filter to demodulate the backscatter signal.

Figures 9A, 9B:
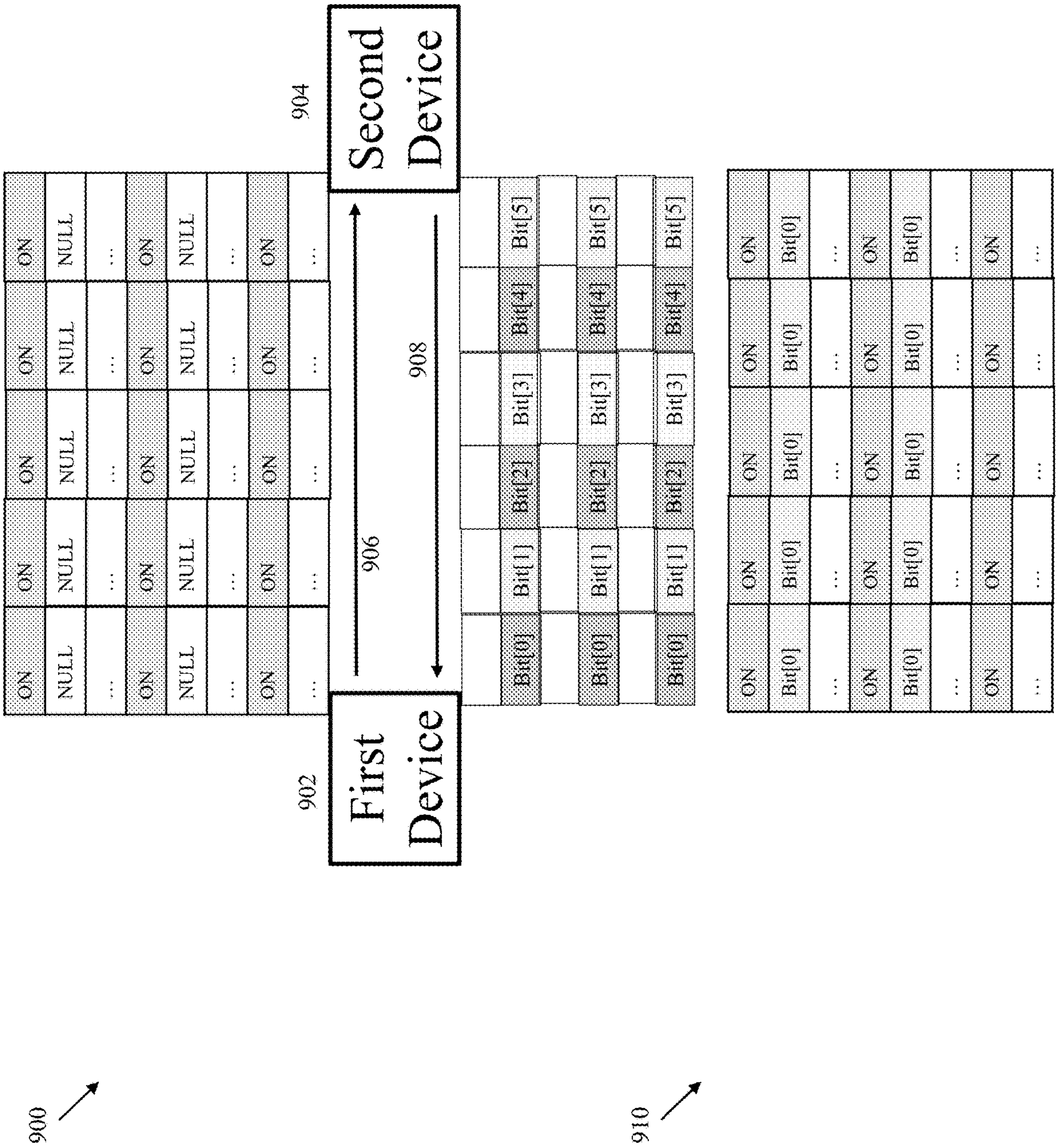
FIGS. 9A, 9B represent a fourth example of WiFi backscatter communication using frequency domain multiplexing (FDM) where distributed RUs (resource units) of an energizing waveform are unpopulated.

FIGS. 9A, 9B represent a fourth example 900 of WiFi backscatter communication using frequency domain multiplexing (FDM) where distributed RUs (resource units) of an energizing waveform are unpopulated. A first device 902 transmits a first signal 904 (e.g. energizing waveform) to a second device 906. The second device 906 replies with a second signal 908 (e.g. modulated backscatter waveform). An example composite signal 910 overlaying the first signal 904 with the second signal 908 is as shown.

The first signal 904 is an Wide BW OFDM waveform that is all "ON" energy for energizer waveform. The first device 902 transmits on a distributed RU (i.e. multiple small RUs in a discrete fashion).

The second device 906 will shift the spectrum to the unpopulated RUs to modulate its backscatter data on. The first device 902 detects the information on the unpopulated RUs.

Figure 10A:
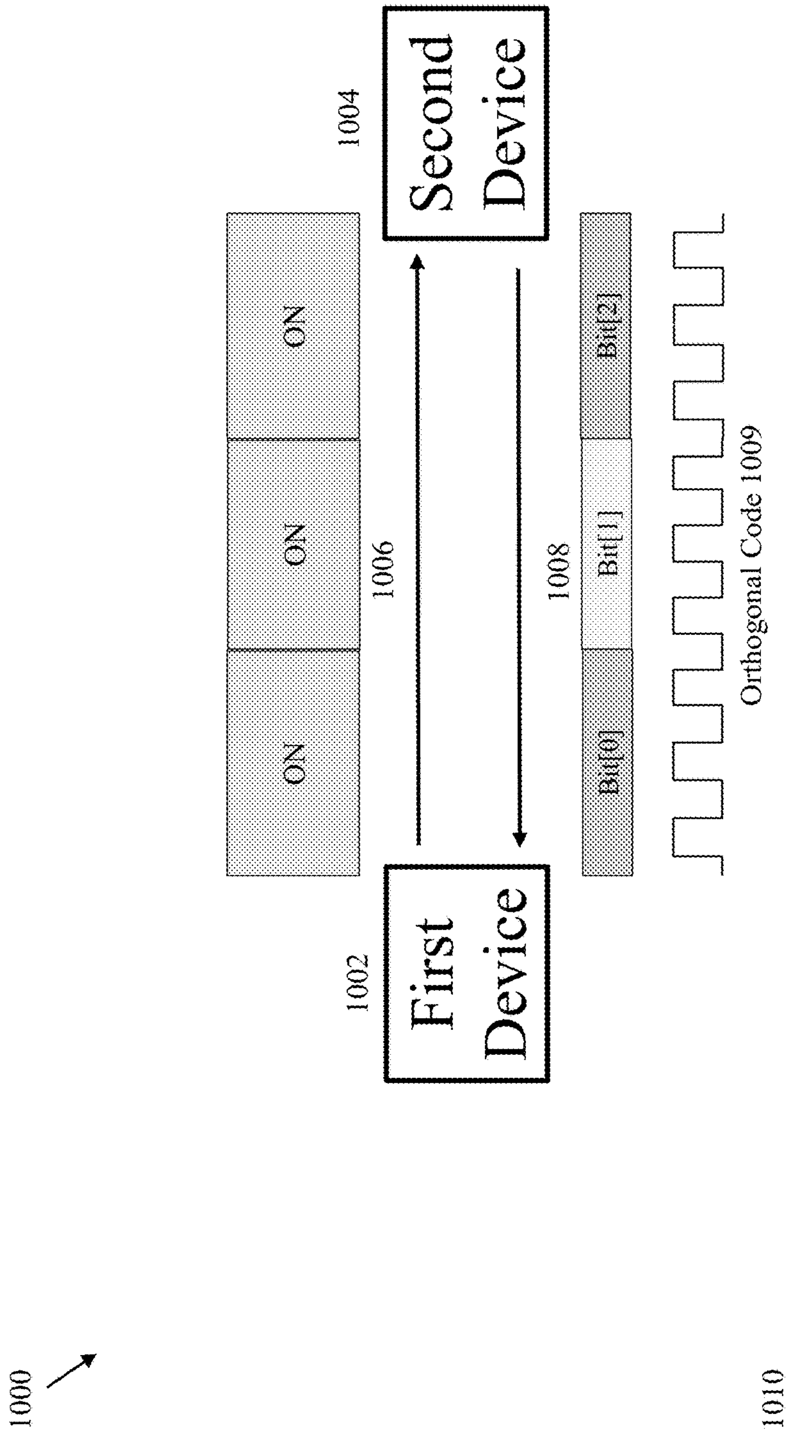
FIGS. 10A, 10B represent an example of WiFi backscatter communication using code domain multiplexing (CDM).
Figure 10B:
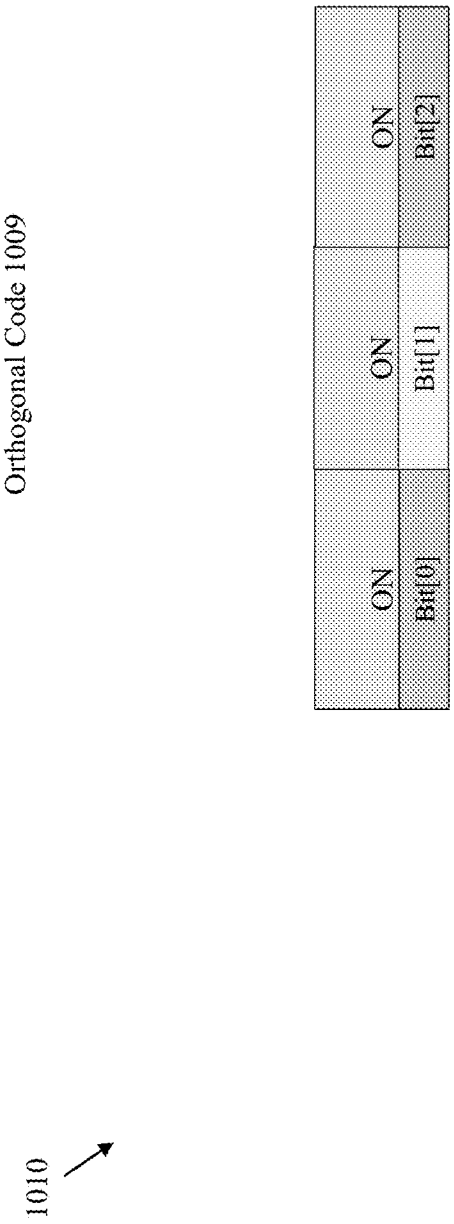

FIGS. 10A, 10B represent an example 1000 of WiFi backscatter communication using code domain multiplexing (CDM). A first device 1002 transmits a first signal 1004 (e.g. energizing waveform) to a second device 1006. The second device 1006 replies with a second signal 1008 (e.g. modulated backscatter waveform). An example composite signal 1010 overlaying the first signal 1004 with the second signal 1008 is as shown.

The first signal 1004 is an Wide BW OFDM/TD (IEEE 802.11b) waveform that is all "ON" energy for energizer waveform.

The second device 1006 modulates the backscatter information using an orthogonal code 1009 on top of OOK modulation (e.g. each bit of "1" can be further masked by a spread code of length N). The first device 1002 detects the info by correlating the spread code from the second device 1104.

In this way unique codes can be assigned to a set of backscatter tags (i.e. second WiFi devices) so that a single reader (i.e. first device) can better distinguish from which tag the backscatter data is coming from. Thus more than one tag can be read at a same time, where each different tag uses different and orthogonal codes, such that the reader can read multiple tag in one reading/scanning event. However, for a single tag reading, the spreading code correlation can also suppress/reduce any leakage signal.

Figure 11A:
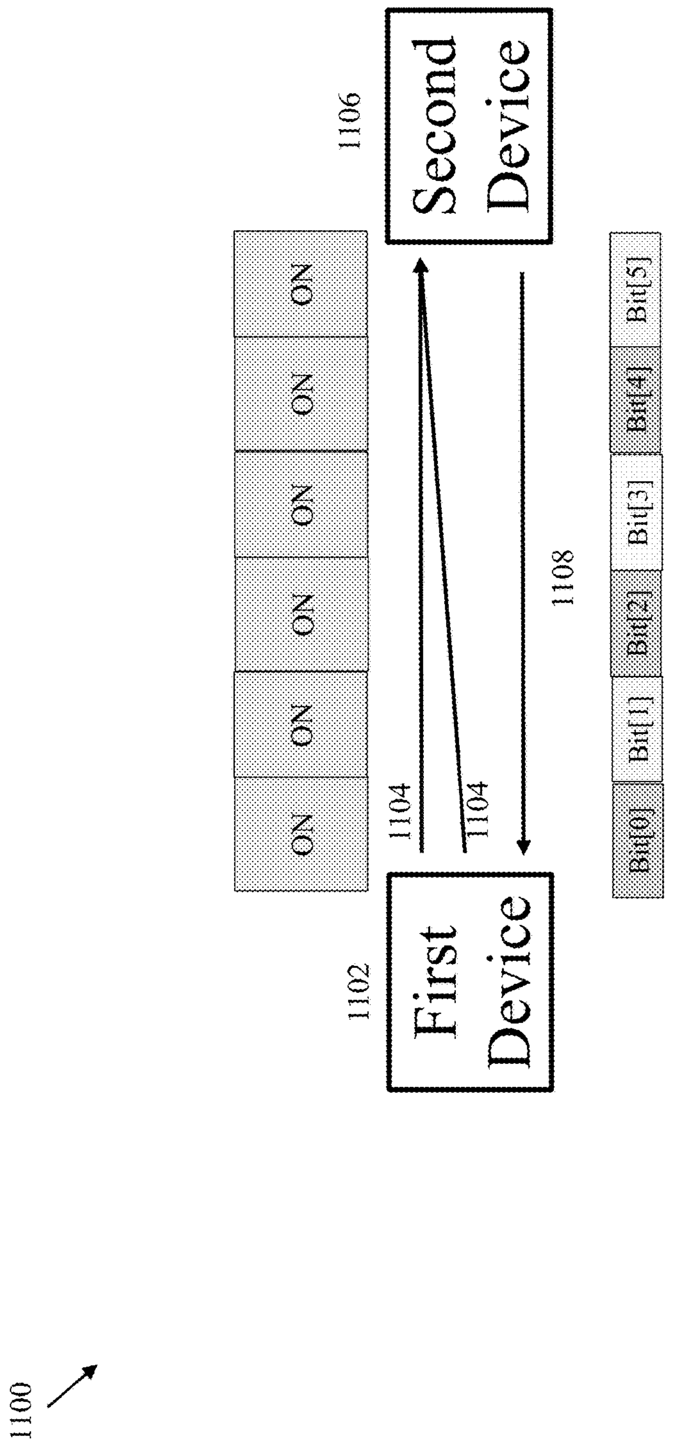
FIGS. 11A, 11B represent an example of WiFi backscatter communication using spatial domain multiplexing (SDM).
Figure 11B:
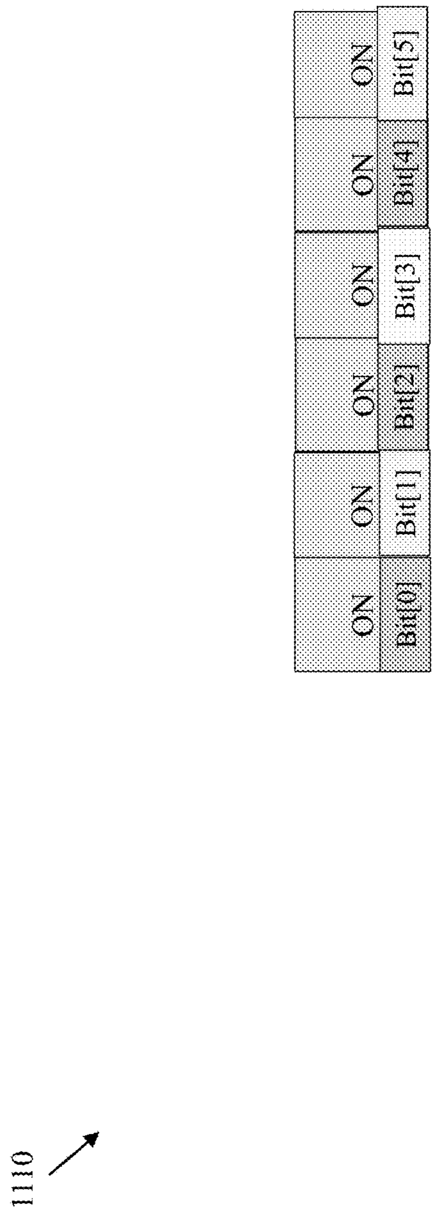

FIGS. 11A, 11B represent an example 1100 of WiFi backscatter communication using spatial domain multiplexing (SDM). A first device 1102 transmits a first signal 1104 (e.g. energizing waveform) to a second device 1106. The second device 1106 replies with a second signal 1108 (e.g. modulated backscatter waveform). An example composite signal 1110 overlaying the first signal 1104 with the second signal 1108 is as shown.

The first signal 1104 is a Wide BW OFDM/TD (IEEE 802.11b) waveform that is all "ON" energy for energizer waveform. The first device's 1102 antennas are configured for spatial mapping the first signal 1104 waveform transmitted to the second device 1106, such that the leakage to the first device's 1102 receiving antenna is minimized.

In various applications of a WiFi backscatter communication device, one or more of the examples discussed above, the following additional variations may be implemented: AMP tag reading; AMP all-in-tone tag; battery-less backscattering tag operating in both sub-1 GHz and 2.4 GHz (or general sub-7 GHz); UHF (900 MHz) and AMP (2.4 GHz) hardware support, with either single antenna with response to both bands, or two antennas with one for each band; a single IC to handle both UHF and AMP functions; logistics/enterprise uses sub-1 GHz UHF function where a special UHF reader to write information to the tag, and read the tag info to track goods status; consumer uses sub-7 GHz AMP function; and generic WiFi device to read product info from tag, e.g. smart phone, smart home hub, public transportation hotspot, etc.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first wireless communications device, comprising:
a transceiver configured to be coupled to a set of antennas;
a controller coupled to the transceiver;
wherein the transceiver is configured to transmit a first signal to a second wireless communications device;
wherein the transceiver is configured to receive a second signal from the second wireless communications device;
wherein the first signal includes a WiFi compliant PPDU (Physical Layer Convergence Procedure Protocol Data Unit) frame; and
wherein the second wireless communications device harvests power from the PPDU frame to provide power for generation of the second signal.

2. The first device of claim 1:
wherein the first device is a WiFi compliant AP (access point).

3. The first device of claim 1:
wherein the second device is only powered by the first signal.

4. The first device of claim 1:
wherein the second device is a backscatter tag.

5. The first device of claim 1:
wherein the second device is configured to harvest power from an energizer waveform in the first signal.

6. The first device of claim 1:
wherein the first and second signals are IEEE 802.11 standard compliant.

7. The first device of claim 1:
wherein the second signal is a backscattered version of the first signal.

8. The first device of claim 1:
wherein the second signal has a same carrier frequency as the first signal.

9. The first device of claim 1:
wherein the second signal includes modulated data obtained from the second device.

10. The first device of claim 9:
wherein the modulated data is encoded using at least one of: On/Off keying (OOK), amplitude shift keying (ASK), frequency shift keying (FSK), or phase shift keying (PSK).

11. The first device of claim 1:
wherein the first device is a WiFi reader device that is configured to both provide power to the second device and receive data from the second device in response.

12. The first device of claim 1:
wherein the first signal has an OFDM preamble.

13. The first device of claim 1:
wherein the second portion of the first signal have an ON energy state; and
wherein the second device is configured to harvest power from an energizer waveform in the first signal.

14. The first device of claim 1:
wherein the second portion of the first signal is a single-carrier waveform.

15. The first device of claim 1:
wherein the second portion of the first signal is an OFDM waveform.

16. The first device of claim 1:
wherein energizing symbols transmitted in the first signal alternate with backscatter data received in the second signal.

17. The first device of claim 1:
wherein the first and second signals are OFDM waveforms;
wherein each of the OFDM waveforms includes a set of resource units (RUs);
wherein a subset of the RUs in the first signal are unpopulated by energizing symbols; and
wherein the second device is configured to transmit data in the second signal in the unpopulated RUs.

18. The first device of claim 17:
wherein a set of edge RUs in the first signal are unpopulated by the energizing symbols.

19. The first device of claim 17:
wherein a set of center resource units (RUs) in the first signal are unpopulated by the energizing symbols.

20. The first device of claim 17:
wherein one-side of the resource units (RUs) in the first signal are unpopulated by the energizing symbols.

21. The first device of claim 17:
wherein a distributed set of resource units (RUs) in the first signal are unpopulated by the energizing symbols.

22. The first device of claim 1:
wherein the second device is configured to uniquely encode data transmitted in the second signal.

23. The first device of claim 1:

wherein the first device is configured to be coupled to a set of antennas that spatially steer transmission of the first signal to the second device and spatially steer transmission of a null in the first signal to a receive antenna in the first device.

24. The first device of claim 1:

wherein the first signal includes a WiFi compliant preamble; and wherein the second device is configured to harvest power from energizing symbols in a portion of the PPDU frame.

25. The first device of claim 1:

wherein the PPDU frame includes a preamble, a set of energizer symbols, and a control payload.

26. The first device of claim 1:

wherein the PPDU frame includes reference symbols; and wherein the first device is configured to use the reference symbols to estimate a leakage signal between a transmit antenna and a receive antenna within the first device and remove a set of energizing symbols from the PPDU frame transmitted in the first signal that are generating the leakage signal.

27. A first wireless communications device, comprising:

a transceiver configured to be coupled to a set of antennas;

a controller coupled to the transceiver;

wherein the transceiver is configured to receive a first signal from a second wireless communications device;

wherein the transceiver is configured to transmit a second signal to the second wireless communications device;

wherein the first signal includes a WiFi compliant PPDU (Physical Layer Convergence Procedure Protocol Data Unit) frame; and wherein the second wireless communications device harvests power from the PPDU frame to provide power for generation of the second signal.

* * * * *